Aug. 17, 1954   R. H. GRIFFIN   2,686,586
FLUID PRESSURE TRANSFER DEVICE FOR CONVEYERS
Filed Nov. 16, 1950   2 Sheets-Sheet 1

Inventor:
Robert H. Griffin
By *Wilmer Mechlin*
his Attorney

Aug. 17, 1954   R. H. GRIFFIN   2,686,586
FLUID PRESSURE TRANSFER DEVICE FOR CONVEYERS
Filed Nov. 16, 1950   2 Sheets-Sheet 2

Inventor:
Robert H. Griffin
By Wilmer Mechlin
his Attorney

Patented Aug. 17, 1954

2,686,586

UNITED STATES PATENT OFFICE 2,686,586

FLUID PRESSURE TRANSFER DEVICE FOR CONVEYERS

Robert H. Griffin, Yonkers, N. Y., assignor to Tanners' Research Corporation, New York, N. Y., a corporation of Delaware Application November 16, 1950, Serial No. 196,021

12 Claims. (Cl. 198—20)

1

This invention relates to conveyors and more particularly to fluid pressure transfer devices therefor.

In apparatus for treating or otherwise handling sheet material and especially non-continuous or individual sheets such as the skins, hides and the like of the tanning industry, it has long been the practice to employ belt or other endless conveyors for transporting the material between stations. Depending on the condition of the material and the path of the conveyor, the material may automatically detach itself from the conveyor at the proper transfer point. However, if the material is tacky or the gravitational pull on it at the transfer point is relatively negligible, due to the direction in which the conveyor travels, and especially if transfer of the material must occur at a predetermined point, it is necessary to provide some means by which the material will be transferred positively from the conveyor to a succeeding support. An illustration of a conveyor in which both of the latter conditions are met is found in the Skin Treating Apparatus of my co-pending application Serial No. 159,436, filed May 2, 1950. Introduced with their inherently tacky flesh sides exposed and usually wet from prior treatment, the skins which the apparatus is particularly designed to treat develop a considerable bond with the feed conveyor and their transfer to a succeeding conveyor is further aggravated by the slightness of the gravitational pull due to the direction of travel of the feed conveyor at the transfer point.

It is, therefore, the primary object of the present invention to provide improved transfer means for positively transferring material from a conveyor to a succeeding support.

Another object of the invention is to provide fluid pressure transfer means which, in conjunction with a perforate conveyor, is capable of positively detaching work from the conveyor at a given point.

An additional object of the invention is to provide a fluid pressure transfer device for conveyors, whereby work can be positively transferred from a conveyor at a given point without encroaching upon the surface of the work exposed for treatment.

A further object of the invention is to provide a hydro-pneumatic transfer device for transferring work from perforate conveyors, which operates more effectively than pneumatic transfer devices with but little of the waste-disposal problem inherent in the use of water jets.

2

Other objects and advantages of the invention will appear hereinafter in the detailed description, be particularly pointed out in the appended claims and illustrated in the accompanying drawings, in which:

Figure 1:
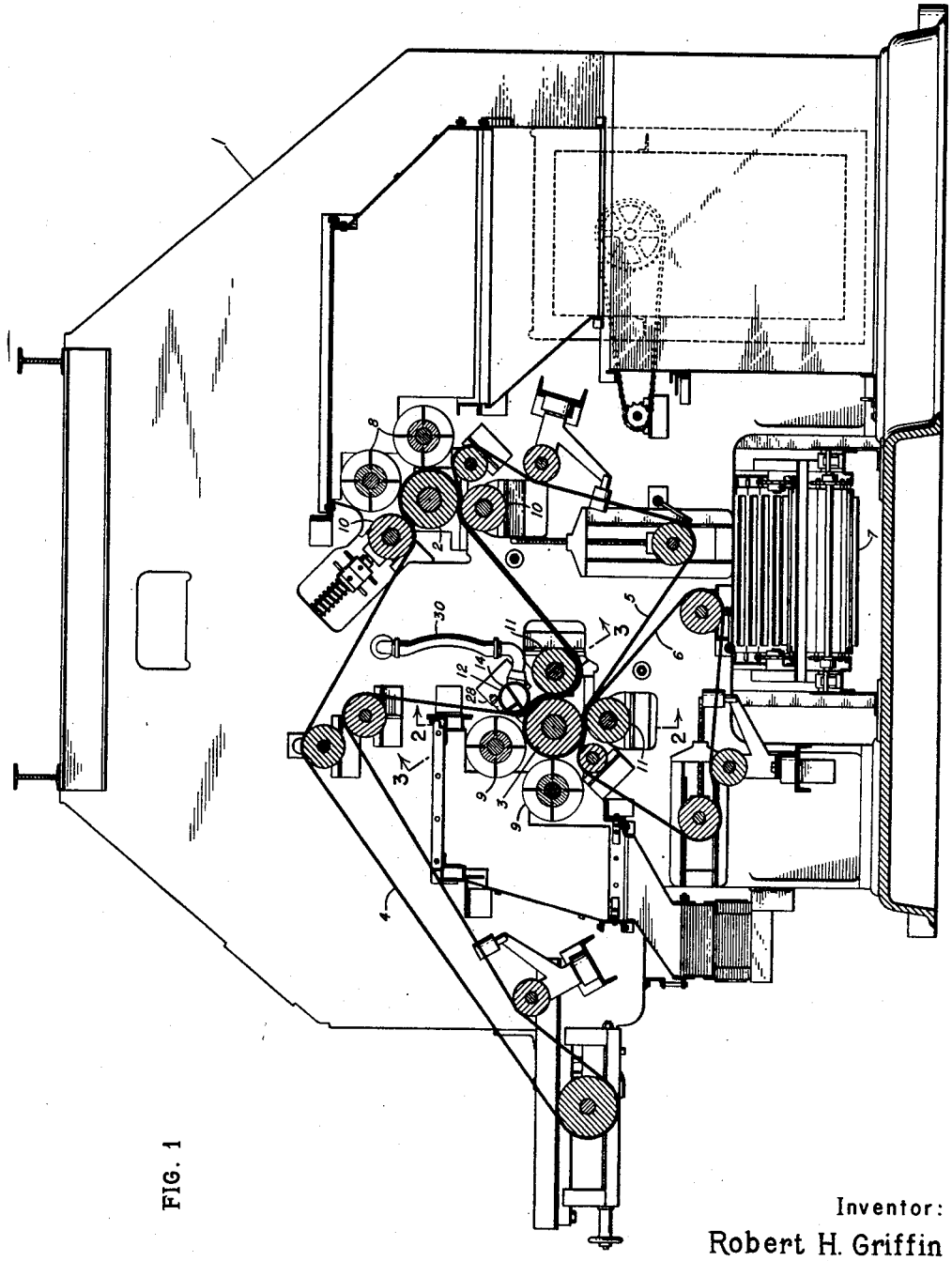
Figure 1 is a longitudinal sectional view of skin treating apparatus, in which has been incorporated a preferred embodiment of the transfer device of the present invention.
Figure 2:
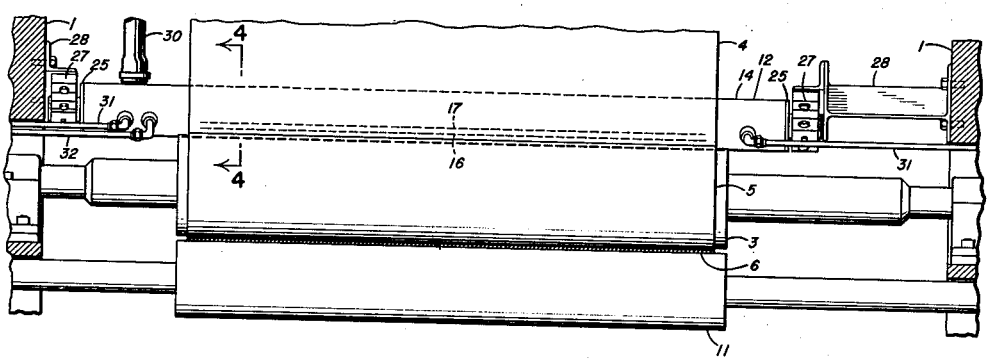
Figure 2 is a fragmentary vertical sectional view on an enlarged scale, taken along the lines 2—2 of Figure 1.

Referring now in detail to the drawings in which like reference characters designate like parts, the improved fluid pressure transfer device of the present invention has been applied for illustrative purposes to the skin treating apparatus of my aforementioned co-pending application as an exemplification of its use. The apparatus, with the exception of the novel transfer device, being described with particularity in that application, only those portions of its structure will here be discussed which are necessary to an understanding of the invention. Moreover, since this apparatus was designed primarily for skin treatment, the term "skins" will be used hereinafter as generic to the skins, hides and other sheet material for the transfer of which the instant transfer device may be employed.

On the above basis, the disclosed apparatus is comprised of a frame having spaced sides or uprights 1, between which are journaled at spaced treating zones a first or unhairing drum 2 and a second or fleshing drum 3. For feeding skins to and through the apparatus, there is employed a conveyor system in which a plurality of conveyors are arranged to receive and support a skin in sequence. In order of their support, these conveyors are a feed conveyor 4 encircling the unhairing drum 2, an intermediate conveyor 5 encircling the fleshing drum 3 and confronting the feed conveyor between the two drums, and end conveyor 6 and a discharge conveyor 7. In travelling through the apparatus, a skin is carried by the feed conveyor 4 over the unhairing drum 2, where its exposed or hair side is unhaired by the counter-rotating cutters or other treating devices 8 in the treating zone of that drum. Beyond the unhairing zone, the skin is gripped between the feed and intermediate conveyors, 4 and 5, and delivered thereby to the fleshing drum 3 with its flesh side now exposed for fleshing by the counter-rotating cutters or other treating devices 9 in the treating zone of that drum. Immediately in advance of the fleshing zone, the feed conveyor 4 diverges from the path of travel of the skins so as to interfere with their subsequent treatment. Carried around the fleshing drum by the intermediate conveyor 5, the skins are transferred therebeyond to the end conveyor 6 and later deposited thereby onto the discharge conveyor 7, by which the treated skins are led from the apparatus. To enable the entire surface of each skin to be treated in a single pass through the two treating zones, the apparatus employs a pair of grip rolls for each of the drums which cooperate with the associated treating devices to present the exposed side in its entirety for treatment, these grip rolls being numbered 10 for the unhairing drum 2 and 11 for the fleshing drum 3.

In the above arrangement of conveyors, the only point at which transfer of a skin is particularly acute is that at which the feed conveyor 4 diverges from the intermediate conveyor 5, since the skin immediately thereafter is presented for treatment and the tackiness of its flesh side, which abuts the feed conveyor, tends to cause the leading edge or neck and succeeding portions of the skin to follow the feed conveyor at least until the leading edge has been gripped by the last of the grip rolls 11. There is thus positioned at this point the transfer device of the present invention, designated generally as 12, the operation of which is either continuous or, and preferably, intermittent in timed relation to the travel of a skin therepast, the latter operation being obtainable by use of a control device such as described in the aforesaid co-pending application.

To transfer, detach or separate skins from the feed conveyor 4 without encroaching upon their exposed surfaces, the transfer device 12 is positioned inside the conveyor and adapted to exert pressure through it against the underside of a skin, the feed conveyor for this purpose being made perforate or foraminous, as by the perforations or pores 13. Due to space limitations in the illustrated apparatus at the transfer point between the first of the grip rolls 11 and cutters 9 of the fleshing drum 3, the transfer device in the form shown is designed both to transfer skins from the feed conveyor and to serve as the guide member about which the feed conveyor turns as it diverges or moves away from the intermediate conveyor 5. To this end, the transfer device is comprised of a housing or shell in the form of a tube, pipe or hollow cylinder 14, which extends transversely of the uprights 1, parallel in axis to the fleshing drum, and through its cylindrical wall 15 bears against or engages the under or inner side of the feed conveyor.

Unlike most fluid pressure applying devices, which use separate nozzles to direct the fluid, the tube 14, itself, is made to direct fluid by longitudinally slotting its wall 15 throughout the extent of the confronting perforated portion of the feed conveyor. The transfer device employing not one fluid, but two, for reasons to be hereinafter pointed out, the tube is designed to handle both by the provision of two circumferentially spaced, longitudinally or axially extending, substantially radially directed elongated orifices, slots or nozzle members, interrupting the wall 15 and both covered by the conveyor, one or the leading slot 16 being positioned in advance of and the other or trailing slot 17 at the transfer point.

For separating the orifices, 16 and 17, the tube 14 is compartmented or divided internally by a longitudinally or axially extending septum, partition or dividing wall 18, extending across the tube and intersecting the wall intermediate or between the orifices. So divided into a lower liquid or water chamber or compartment 19 connecting with the leading orifice 16 and an upper chamber 20, the interior of the tube is further subdivided by a rib, web or wall 21 extending longitudinally or axially of the upper chamber 20 and intersecting the septum 18 toward the orifice-separating edge of the latter. The rib 21 thus forms with the included segments of the wall 15 and septum 18, a relatively restricted air or pneumatic chamber or compartment 22, connected with the trailing orifice 17, the rib also serving to reinforce or stiffen the septum intermediate its longitudinal edges.

Figure 3:
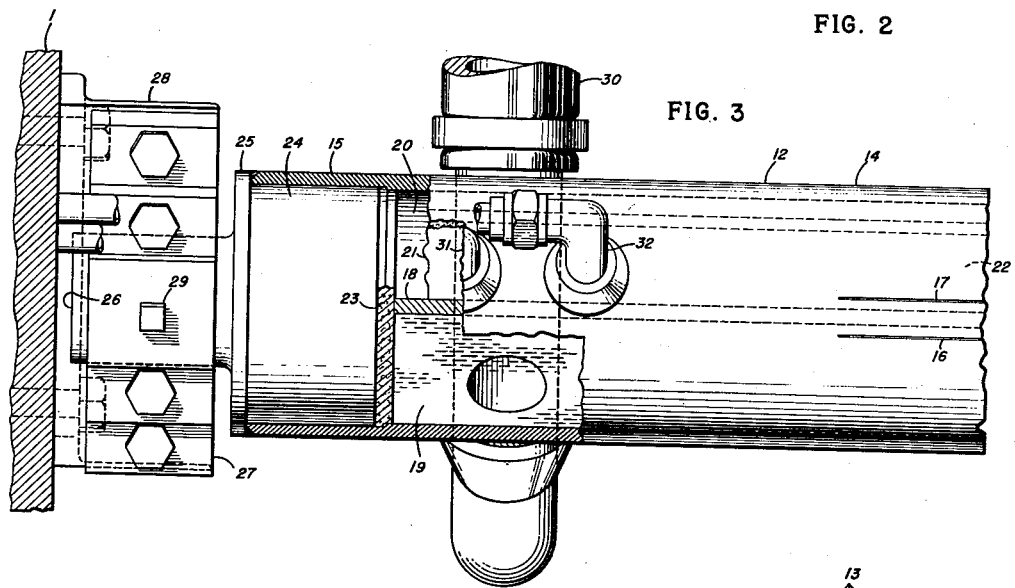
Figure 3 is a fragmentary transverse sectional view on a greatly enlarged scale, taken along the lines 3—3 of Figure 1.
Figures 4, 5:
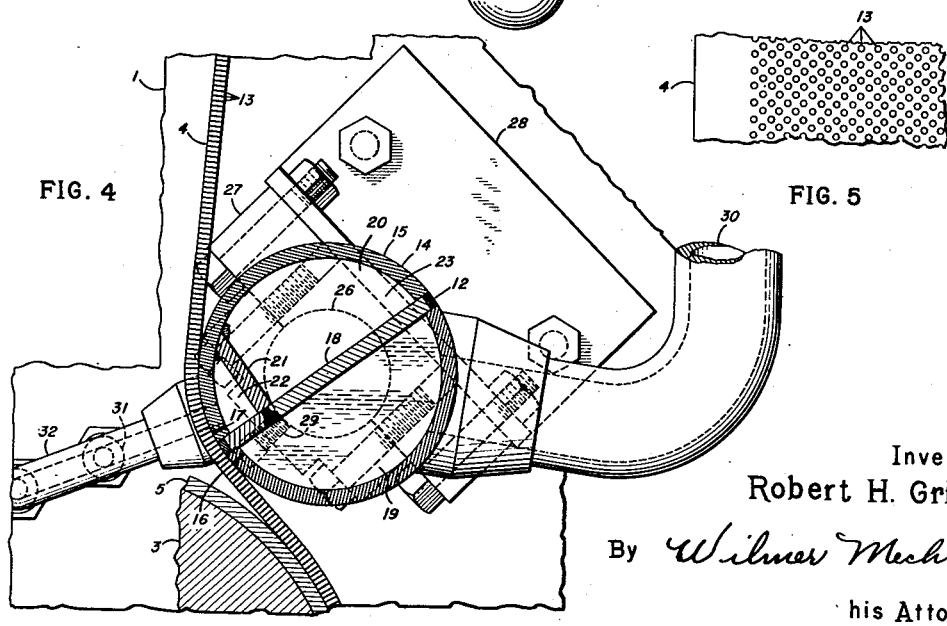
Figure 4 is a fragmentary vertical sectional view on the scale of Figure 3, taken along the lines 4—4 of Figure 2.
Figure 5 is a plan view of a fragment of the conveyor with which the transfer device is employed.

As shown in Figure 3, the septum 18 and rib 21 extend a substantial distance beyond the longitudinal extremities of the orifices, 16 and 17, to afford, beyond either side of the conveyor 4, adequate space for the attachment of fittings by which fluid may be introduced into the tube 14. The ends of the compartments, beyond the fittings, are sealed or plugged by annular gaskets 23, each held or pressed tightly against the corresponding or confronting ends of the septum and rib by a plug 24, these plugs being fixed axially of the tube 14, as by integral peripheral flanges 25 abutting the tube ends, and being secured thereto by welding or like suitable means. Outwardly of their flanges, the plugs 24 are provided with integral restricted neck portions or stub shafts 26, each of which is supported in a cradle or mounting 27, split for ready removal of the tube 14 from the apparatus, the cradles, in turn, being supported on or secured to the uprights 1 by mounting brackets or hangers 28. Since the positions of the orifices, 16 and 17, are fixed by the transfer point, the tube is fixed or held against rotation by suitable means, such as the illustrated set screws 29. The consequent stationary mounting of the tube also requires that it be sufficiently spaced from or clear of the fleshing drum 3 to avoid imposing a frictional drag on the latter through the intervening conveyors. However, this clearance is held to a minimum so as to avoid dislodgement or separation of skins from the intermediate conveyor 5 in advance of the transfer point.

It has been mentioned that the tube 14 is adapted to apply a plurality of fluids to a skin, for which purpose it is provided with two orifices, 16 and 17, and the correspondingly compartmented interior. In experimenting with fluids as transfer media, it was found that water or like liquid, alone, while affording the necessary mass or body, brought with it a considerable problem in waste disposal. Air or like gas, on the other hand, while eliminating the waste problem, had insufficient mass to effect transfer, unless applied under very high pressure. In the transfer device of the present invention, both fluids are used to advantage, such that the efficiency of a water jet is obtained with a minimum of waste liquid. This is accomplished by introducing or admitting water into the main lower or water chamber 19 through a water feed line 30 and air to the air compartment through a pair of air feed lines 31, one of the air feed lines being connected adjacent each extremity of the air chamber, to substantially equalize the resultant pressure over the length of the air orifice 17. A secondary or supplemental water line 32 is shown connected to the air chamber 22, this to enable water to be admitted to the air chamber and admixed with the air to meet special conditions where supplying of additional mass by the air jet is of advantage.

Of the two fluids, the water is introduced into the water compartment 19 under relatively low pressure, that preferred being sufficient to cause the water to flow from the water orifice 16 and, by wetting the underside of the conveyor, penetrate and impregnate or fill the perforations 13 before they reach the air orifice 17, without expelling or spraying the water from the other side of the conveyor, the flow from the orifice thus being in the nature of aggravated seepage or welling. So filled, each pore becomes a miniature gun, with the entrained or entrapped water as its projectile and air as the propellant. Consequently, as the filled pores come opposite the air orifice 17, the compressed air of the latter propels, projects or expels the water from the outer or opposite side of the conveyor and bombards the confronting portion of the underside of each skin across its entire width with water slugs or pellets. It is thus only necessary to apply air under a pressure sufficient to apply, through these slugs, the force needed to rupture the bond or adhesion between the skins and the feed conveyor 4, to effect transfer of the skins to the intermediate conveyor 5. In practice, air introduced into the air chamber 20 under a pressure of from 40–80 pounds per square inch has proven adequate for transferring skins under a wide range of conditions.

The above hydro-pneumatic transfer starts with the leading edge of a skin and continues down its length at least until the leading edge is gripped by the last of the grip rolls 11, whereafter the balance of the skin can be drawn off the feed conveyor without assistance from the transfer device. If an automatic control is provided, such as is described in my aforesaid co-pending application, the feed of both fluids is shut off after the grip roll takes hold, to resume as the leading edge of a succeeding skin reaches the transfer area. Using individual pellets of water or other liquid as its mass and air or other gas as its propellant, the instant transfer device applies a very small volume of water to the work being transferred and, in the case of skins, adds but little to their initial wetness, rendering the disposal of the waste water a negligible problem.

Pressure sealing of the air and water chambers, 19 and 20, by the sealing gaskets, to preserve the desired difference in the hydraulic and pneumatic pressures at the two orifices, is provided in the illustrated embodiment by welding the several longitudinal joints of the septum 19 and rib 21. Such welding is readily accomplishable by constructing the transfer tube 14 of two semi-cylindrical sections and building the internal structure out from one of the sections before the two are welded together about the longitudinal edges of the septum. The other connections in the transfer device, those between the pipe and the several feed lines, may be obtained by the illustrated welded or other fittings suitable for making the connections fluid-tight under the pressure to which they are subjected, this due to the low hydraulic pressure employed being of moment primarily in the air lines 21 and, when used, the secondary water line 32.

From the above detailed description, it will be apparent that there has been provided an improved fluid pressure transfer device for use in conjunction with perforate conveyors for transferring work therefrom at a designated transfer point, the device by using both water and air as its transfer media requiring relatively low operating pressures and holding the liquid waste to a minimum. It should be understood that the described and disclosed embodiment is merely exemplary of the invention and that all modifications are intended to be included which do not depart either from the spirit of the invention or the scope of the appended claims.

Having described my invention, I claim:

1. In apparatus for treating sheet material, the combination of a pair of rotary drums positioned in spaced treating zones for receiving and supporting material in sequence, a perforate endless conveyor encircling one of said drums, an endless conveyor encircling said other drum, said conveyors running and coacting between said drums for conveying said material to said other drum, and fluid pressure means exterior of said drums and acting from a side of said perforate conveyor opposite said other drum for transferring said material to said other drum.

2. A transfer device for a perforate conveyor comprising means for impregnating said conveyor with liquid in advance of a point of transfer of work therefrom, and pneumatic means for ejecting said liquid from said conveyor at said transfer point against an underside of said work and transferring said work from said conveyor.

3. A transfer device comprising a perforate endless conveyor for conveying work, hydraulic means associated with said conveyor for impregnating perforations thereof with liquid in advance of a point of transfer therefrom, and pneumatic means for applying pressure to said liquid at said transfer point and ejecting said liquid from said conveyor against an underside of said work.

4. A transfer device for a perforate endless conveyor comprising means for wetting an inner side of said conveyor with liquid in advance of a point of transfer therefrom, and pneumatic means for projecting said liquid through said conveyor at said transfer point against an underside of work supported on said conveyor to detach said work therefrom.

5. A fluid pressure transfer device for a perforate endless conveyor comprising a pair of nozzle means associated with said conveyor, each of said nozzle means being disposed to direct fluid against an inner side of said conveyor, one in advance of and the other at a point of transfer of work from an outer side of said conveyor, and means for feeding water to said advanced of said nozzle means and air to said other of said nozzle means.

6. A fluid pressure transfer device for a perforate endless conveyor comprising a pair of nozzle means associated with said conveyor, each of said nozzle means being disposed to direct fluid against an inner side of said conveyor, one in advance of and the other at a point of transfer of work from an outer side of said conveyor, and means for feeding water to said advanced of said nozzle means and air under relatively high pressure to said other of said nozzle means.

7. A fluid pressure transfer device for a perforate endless conveyor comprising a pair of nozzle means associated with said conveyor, each of said nozzle means being disposed to direct fluid against an inner side of said conveyor, one in advance of and the other at a point of transfer of work from an outer side of said conveyor, and separate means for feeding water to said advanced of said nozzle means and air under relatively high pressure to said other of said nozzle means.

8. A fluid pressure transfer device for a perforate endless conveyor comprising a pair of members associated with an inner side of said conveyor, a fluid chamber in each of said members, and nozzle means connected to each of said chambers, said nozzle means each directing fluid under pressure against an inner side of said conveyor, one in advance of and the other at a point of transfer of work from an outer side of said conveyor, for sequentially wetting said conveyor with liquid and projecting said liquid through said conveyor against said work.

9. A fluid pressure transfer device for a perforate endless conveyor comprising a pair of members associated with an inner side of said conveyor, a water chamber in one of said members, an air chamber in said other member, and nozzle means connected to each of said chambers, said nozzle means each directing fluid under pressure from the connected of said chamber against an inner side of said conveyor, said water in advance of and said air at a point of transfer of work from an outer side of said conveyor, for sequentially wetting said conveyor with water and pneumatically projecting said water through said conveyor against said work.

10. A fluid pressure transfer device for a perforate endless conveyor comprising a tube abutting against and extending across an inner side of said conveyor, a pair of orifices in said tube, said orifices extending axially of said tube and being spaced circumferentially thereof in the direction of travel of said conveyor, means for partitioning said tube into separate water and air chambers connected respectively to the leading and the trailing of said orifices, and means for admitting water under pressure to said water chamber and air under relatively high pressure to said air chamber.

11. A fluid pressure transfer device for a perforate endless conveyor comprising hydraulic and pneumatic means associated with an inner side of said conveyor and spaced along the path of travel thereof, said hydraulic means wetting said conveyor with fluid in advance of said pneumatic means, and said pneumatic means driving said fluid through said conveyor and detaching work from the outer side thereof.

12. A fluid pressure transfer device for a perforate endless conveyor comprising a pair of nozzle means associated with said conveyor, each of said nozzle means being disposed to direct fluid against an inner side of said conveyor, one in advance of and the other at a point of transfer of work from an outer side of said conveyor, and means for feeding water to said advanced of said nozzle means and a mixture of air and water under relatively high pressure to said other of said nozzle means.

References Cited in the file of this patent

UNITED STATES PATENTS

| Number | Name | Date |
|---|---|---|
| 890,292 | Monette | June 9, 1908 |
| 2,168,419 | Paterson | Aug. 8, 1939 |
| 2,377,123 | Ballamy et al. | May 29, 1945 |
| 2,439,419 | Donner | July 1, 1948 |